June 12, 1962  G. W. LUCKEY ETAL  3,038,800
PHOTOPOLYMERIZATION OF OLEFINICALLY-UNSATURATED
MONOMERS BY SILVER HALIDES
Filed Dec. 19, 1957
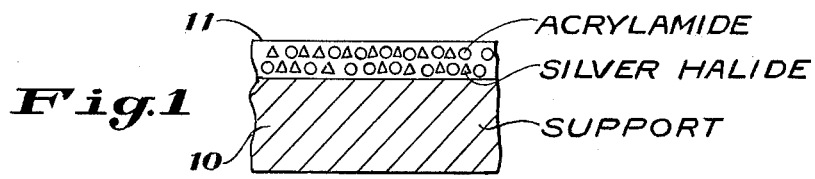
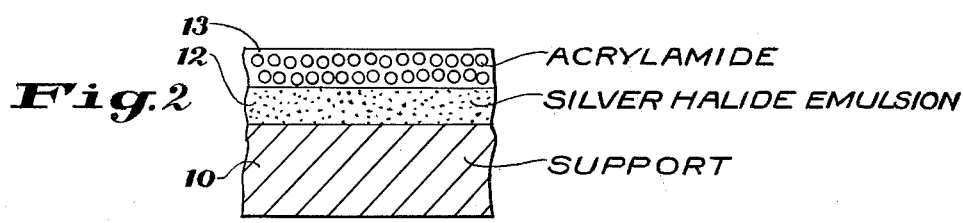
George W. Luckey
William West
R. Frank Smith
INVENTORS
BY Lawrence H. Willis
ATTORNEYS 3,038,800
PHOTOPOLYMERIZATION OF OLEFINICALLY-UNSATURATED MONOMERS BY SILVER HALIDES
George W. Luckey and William West, Rochester, N.Y., assignors to Eastman Kodak Company, Rochester, N.Y., a corporation of New Jersey
Filed Dec. 19, 1957, Ser. No. 703,882
12 Claims. (Cl. 96—35)

This invention relates to a process of polymerizing olefinically-unsaturated monomers by means of actinic radiation (including visible or ultraviolet radiation) using silver halides as catalysts, and more particularly, to a method of forming photographic images in relief.

It is known that many compounds containing olefinic unsaturation can be polymerized using a variety of polymerization catalysts. A large number of such catalysts are organic or inorganic peroxides, which are generally dissolved in water or an organic solvent medium before use. However, such systems are not readily adaptable to the polymerization of olefinically-unsaturated monomers for the purpose of recording photographic images. The advantages in using a solid type of catalyst in such a polymerization process are immediately apparent, since such monomers can be contacted with the solid surface and their polymerization localized primarily to a limited area. The more limited the reaction is, the better are the results obtained, insofar as photographic rendition is concerned.

Accordingly, it is an object of our invention to provide an improved process of polymerizing olefinically-unsaturated monomers using solid catalysts. Another object is to provide a method of producing records photographically through the photopolymerization of such monomers. Still another object is to provide an improved method of photographic, graphic reproduction. Other objects will become apparent from a consideration of the following examples and description.

According to our invention, we photopolymerize olefinically-unsaturated monomers using silver halides as catalysts. The polymerizations are performed in aqueous media, which means that our process is particularly adapted for polymerizations using monomers which are soluble, at least partly, in water. By monomers which are at least partly soluble in water, we mean monomers which can be dissolved in water at room temperature at least to the extent that acrylonitrile or calcium acrylate is soluble.

The silver halides which are particularly useful in practicing our invention comprise silver chloride, silver chlorobromide, silver bromide, silver bromiodide, etc. These silver halides can be used in the form of aqueous suspensions obtained by precipitating the silver halides in water by intermixing an alkali metal halide with silver nitrate, or the silver halides can be used in the form of conventional photographic silver halide emulsions. When using silver halide precipitates, it is generally desirable to have a grain size which is rather small, such grain sizes being identified in photography as fine grain silver halides. For example, such precipitates can easily be prepared by simply mixing aqueous 0.1 N solutions of silver nitrate and an alkali metal halide.

When it is desirable to use the silver halide of a photographic silver halide emulsion as a catalyst, any of the conventional silver halide emulsions can be employed. Generally, such emulsions contain a vehicle which is usually a hydrophilic colloid, such as gelatin, albumen, hydrolyzed cellulose esters, hydrolyzed polyvinyl acetate, etc. We have found that the hydrophilic colloids present in such emulsions do not have any serious effects on the desired photopolymerizations. Where desired, a hardening agent for the hydrophilic colloid can be included in the polymerization mixtures. For example, sodium sulfate can be added to the polymerization mixtures, or ordinary silver halide emulsions which have been hardened with formaldehyde can be used.

We have found that the quantity of polymerizable monomer in the aqueous medium has a marked effect upon the results obtained in our process. If too small amounts of monomers are employed, the amount of polymerization is negligible and no useful product can be separated from the polymerization mixture. However, if the amount of monomer present in the aqueous medium is at least equivalent to 10 grams per liter of solution, excellent results can be obtained. The maximum amount of monomer used can be varied, and in general, an amount can be used up to the amount which causes the reaction mixture to become too thick to spread evenly on a supporting surface. Practical coatings can be obtained having monomer concentrations as high as 600 grams per liter, or even higher. The precise amounts will depend somewhat upon the solubility of the particular monomer in water and the temperature of the polymerization mixture.

Water-soluble monomers of the type which can be employed in our invention comprise acrylic or methacrylic monomers, such as acrylic acid, acrylamide, methacrylamide, calcium acrylate, acrylonitrile, etc., vinylpyrolidone, vinylpyridine alkyl salts (e.g., 1,2-dimethyl-5-vinylpyridinium methosulfate, etc.), etc.

The speed of the photopolymerization can be considerably accelerated by adding an alkali metal sulfite (e.g., sodium sulfite) to the aqueous polymerization medium. The amount of alkali metal sulfite can be varied depending upon the temperature of the polymerization, amount of water present, etc., although we have generally found that from about 0.1 to 100 grams per liter of polymerization mixture is satisfactory.

The polymerization of the monomers can be effected by coating a mixture containing the monomer in aqueous solution and a silver halide precipitate, and preferably a small amount of an alkali metal sulfite, on a supporting surface, such as glass, cellulose ester film, polyvinyl acetal film, aluminum foil, etc., and exposing the coating to a subject, using actinic radiation for a sufficient period of time to cause selective hardening of the exposed portions of the coating, with little or no hardening of the unexposed portions. The unexposed portions can then be removed from the supporting surface by gentle washing with water, or a liquid which is a solvent for the monomer but not the polymer. In general, it is preferable to employ a transparent support and to expose the coating through the support so that the areas adjacent to the support are hardened through the polymerization of the monomer. Instead of mixing the polymerizable monomer with a silver halide precipitate as described, it can be mixed with a liquid, photographic silver halide emulsion.

Alternatively, an ordinary photographic silver halide emulsion coated on a conventional support, such as a cellulose acetate film, can be soaked in a water solution containing the monomer (and an alkali metal sulfite) for a period of time sufficient to impregnate the photographic emulsion with the solution. The coating can then be exposed in the manner described above to produce a visible image after washing. It is also possible to simply coat the photographic silver halide emulsion layer with a layer containing monomer, water, and preferably an alkali metal sulfite. Exposure of the emulsion through the transparent support then causes selective hardening of the monomer as a result of polymerization, and the unexposed portions can be removed by washing as described above.

We have found that apparently the monomer is adsorbed to the surface of the silver halide grain, from which is absorbed the energy required to produce polymerization. The silver halides customarily employed are sensitive to radiation in the blue and ultraviolet regions of the spectrum, and, accordingly, the exposing source should emit radiation predominantly in the region to which the silver halide is sensitive. We have found that the sensitivity of the silver halides can be extended using spectral sensitizing dyes of the type which have been previously employed in photography. Such dyes comprise the conventional cyanine, carbocyanine, merocyanine, merocarbocyanine, styryl, hemicyanine, etc., dyes. Such dyes are well known and have been previously described in a number of patents and textbooks. See, for example, "The Theory of the Photographic Process," by C. E. K. Mees (Revised Edition, 1954, Macmillan), pages 371–421. If desired, a mixture of dyes can be used to produce a supersensitizing effect upon the silver halides.

Simple cyanine and carbocyanine dyes useful in sensitizing the silver halides of our invention include the dyes represented by the following general formula:

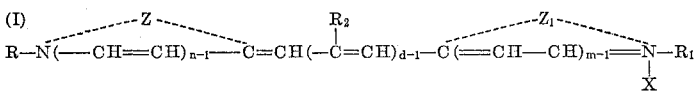

wherein R and $R_1$ each represents an alkyl group, such as methyl, ethyl, propyl, butyl, β-sulfoethyl, β-hydroxyethyl, etc., $R_2$ represents a hydrogen atom, an alkyl group, such as methyl, ethyl, propyl, etc., or an aryl group, such as phenyl, tolyl, chlorophenyl, etc., X represents an acid radical, such as bromide, chloride, iodide, p-toluenesulfonate, benzenesulfonate, methylsulfate, etc., $d$, $m$, and $n$ each represents a positive integer of from 1 to 2, and Z and $Z_1$ each represents the non-metallic atoms necessary to complete a heterocyclic nucleus containing from 5 to 6 atoms in the heterocyclic ring, such as those of the benzoxazole series, those of the benzothiazole, those of the quinoline series, etc. Typical of the dyes represented by Formula I which can be used in our invention are those represented by Formula I of Carroll et al. U.S. Patent 2,704,174, issued March 22, 1955.

The simple merocyanine and merocarbocyanine dyes useful in practicing our invention include the dyes represented by the following general formula:

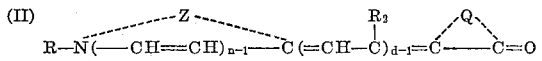

wherein R, Z, $R_2$, $n$ and $d$ each have the values given above, and Q represents the non-metallic atoms necessary to complete a heterocyclic nucleus containing from 5 to 6 atoms in the heterocyclic ring, such as those of the rhodanine series, those of the pyrazolinone series, etc. Typical nuclei defined by Q are those defined under Formula II of the dyes in U.S. Patent 2,704,714 mentioned above.

The styryl and hemicyanine dyes useful in practicing our invention include the dyes represented by the following general formula:

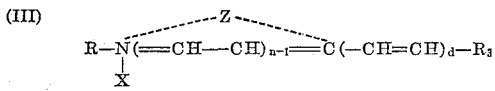

wherein R, Z, X, $n$ and $d$ each have the values given above, and $R_3$ represents an arylamino group, such as anilino, methylanilino, chloroanilino, etc., or an aminophenyl group, such as aminophenyl, dimethylaminophenyl, diethylaminophenyl, etc. Typical hemicyanine dyes useful in practicing our invention are disclosed in White U.S. Patent 2,369,509, issued February 13, 1945, and Carroll U.S. Patent 2,533,427, issued December 12, 1950 (dyes of Formula II).

Specific sensitizing dyes which can be used alone, or in admixture with one another, are the dyes represented by the following formulas:

(1)
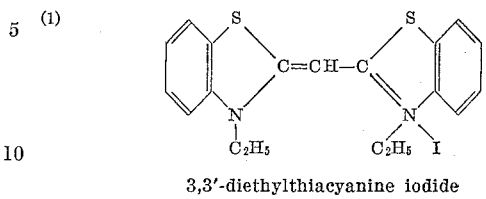
3,3'-diethylthiacyanine iodide (2)
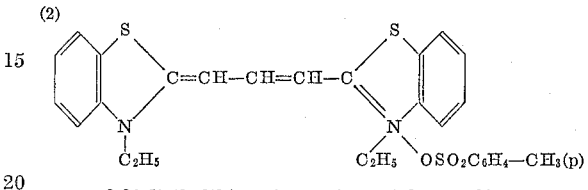
3,3'-diethylthiacarbocyanine p-toluenesulfonate (3)
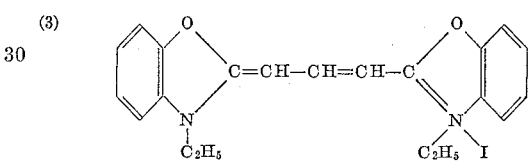
3,3'-diethyloxacarbocyanine iodide (4)
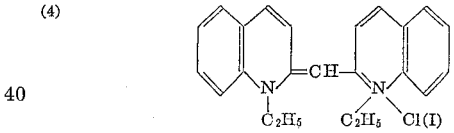
1,1'-diethyl-2,2'-cyanine chloride (or corresponding iodide)

(5)
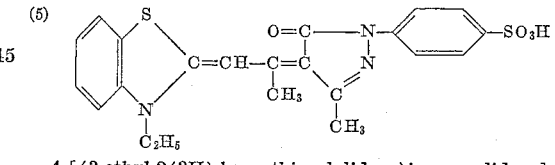
4-[(3-ethyl-2(3H)-benzothiazolylidene)isopropylidene]-3-methyl-1-(p-sulfophenyl)-5-pyrazolinone (6)
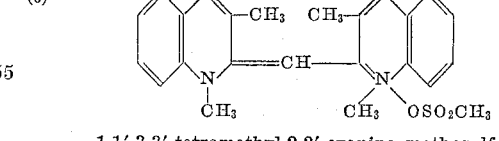
1,1',3,3'-tetramethyl-2,2'-cyanine methosulfate (7)
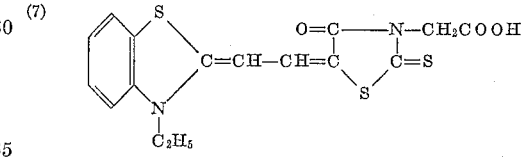
3-carboxymethyl-5-[(3-ethyl-2(3H)-benzothiazolylidene)-ethylidene]rhodanine (8)
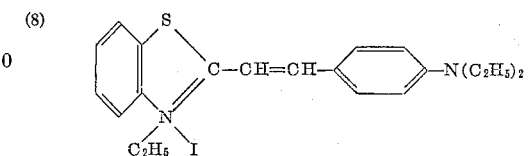
2-(p-diethylaminostyryl)benzothiazole ethiodide

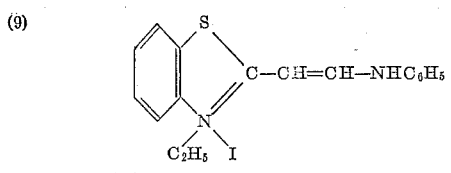

(9) 2-(anilinovinyl)benzothiazole ethiodide

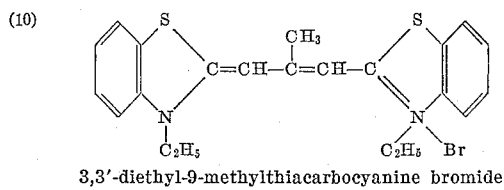

(10) 3,3'-diethyl-9-methylthiacarbocyanine bromide

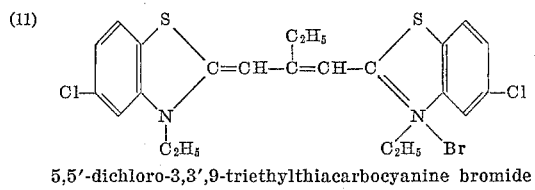

(11) 5,5'-dichloro-3,3',9-triethylthiacarbocyanine bromide

The amount of silver halide used as catalyst in practicing our invention can be varied, depending upon the particular manner in which the silver halide is combined with the polymerizable monomer. That is, different amounts can be used, depending upon whether an ordinary silver halide precipitate is employed, or whether a photographic silver halide emulsion is used. Moreover, the silver halide can be intermixed in aqueous medium with the polymerizable monomer, or the polymerizable monomer can be placed in contact with a colloid layer containing silver halide, as described above. Since our compositions are useful primarily in photography, the most useful amounts of ingredients can be defined with reference to the square area of surface which is exposed to the actinic radiation. The concentration of silver halide used, as thus expressed, should be at least 1 milligram per square centimeter of area exposed to the radiation, while the amount of monomer used should be at least 0.1 milligram per square centimeter of area exposed (providing the concentration of monomer in the polymerization mixture is at least 10 g./liter). The concentration of the alkali metal sulfite used would, accordingly, be approximately at least $\frac{1}{100}$ the concentration of the polymerizable monomer and should not generally be more than ten times the concentration of the monomer. In other words, the concentration of the alkali metal sulfite in the coating should be at least about $10^{-3}$ milligrams per square centimeter. The most useful concentration of silver halide for a given purpose can be easily determined, using the following examples as guides. Ordinarily, a greater mass of silver halide and monomer are needed for complete utilization of long wavelength light.

The following examples will serve to illustrate more fully the manner of catalyzing the polymerization of water-soluble monomers using silver halides as catalysts. The coatings were prepared as described in the examples, and then exposed to radiation from a 250-watt British Thompson-Houston Type ME/D mercury arc. Such radiation has high actinic value, but low heat content. Placed between the illuminating source and the coating was a 500-mm. Bausch and Lomb Grating Monochromator. The light output was measured with a Weston photocell. This photocell was calibrated with a thermopile-galvanometer combination which had been standardized with Bureau of Standards' lamps C–52 and C–675. It was found that the light intensity of the ME/D arc was comparable to that of a 1000-watt, Type AH–6 mercury arc at 365, 405 and 436 m$\mu$, while there was much less background radiation in the wavelength region between the mercury lines. The subjects recorded in the following examples were either ordinary line copies or half-tone negatives. While the technique described can be used for continuous tone reproduction, it is particularly useful in producing line copy and half-tone duplicates.

*Example 1*

One gram of silver chloride precipitate was mixed with 5 grams of an aqueous solution containing 30% by weight of acrylamide. The thick mixture was then coated on ordinary cellulose acetate film base, covering an area of 12.5 cm.$^2$. The coating was then exposed in air to $4 \times 10^{16}$ quanta/cm.$^2$ of 365 m$\mu$ radiation. After the exposure, the coating was washed with a current of water which removed the unexposed areas. The exposed area was not soluble in water and adhered to the cellulose acetate surface. Glass was also found useful as a supporting surface in place of the cellulose acetate.

*Example 2*

One gram of silver bromide precipitate was mixed with 5 grams of an aqueous solution which had been obtained by dissolving 400 grams of acrylamide and 10 grams of sodium sulfite in 1 liter of water. The resulting mixture was then coated on an ordinary glass surface, covering an area of 12.5 cm.$^2$. The coating was exposed in air to $3 \times 10^{16}$ quanta/cm.$^2$ of 436 m$\mu$ radiation. After exposure, the thick, pasty coating was washed with a current of water which removed the unexposed areas. The exposed areas were not soluble and adhered to the glass surface.

*Example 3*

A water solution containing 400 grams per liter of acrylamide and 20 grams per liter of sodium sulfite was prepared and allowed to stand for 3 days. An ordinary fine grain gelatino-silver-bromiodide emulsion, which has been sulfur sensitized, was soaked in this acrylamide solution, and removed from the solution. The emulsion contained 0.02 gram of the acrylamide solution/cm.$^2$. The soaked emulsion was exposed through a line image, while still wet, to $2 \times 10^{16}$ quanta/cm.$^2$ of 436 m$\mu$ radiation. The exposed emulsion was then given a 20-second wash in 15% water-thiourea solution, which removed the unexposed areas of the emulsion. The exposed areas were not readily soluble in the thiourea solution, leaving an image of acrylamide polymer, gelatin and silver. If desired, the silver can be removed by treatment with a bleaching solution, such as potassium bichromate solution, followed by treatment with a silver halide solvent, such as sodium thiosulfate.

*Example 4*

A water solution containing 50% acrylic acid by volume and 10 grams per liter of sodium sulfite was prepared. An ordinary fine grain gelatino-silver-bromiodide emulsion, which had been sulfur sensitized, was immersed in this solution and then removed. The wet emulsion contained 0.02 gram of the acrylic acid solution/cm.$^2$. While still wet, the soaked emulsion was exposed to a line image by means of $1 \times 10^{17}$ quanta/cm.$^2$ of 436 m$\mu$ radiation. After exposure, the emulsion was thoroughly rinsed with water and bathed in a 15% thiourea-water solution until the silver halide dissolved. The emulsion was then given another water wash and dried. A relief image remained in the photographic support. This was produced by deformation of the cellulose acetate-butyrate film base (by penetration of acrylic acid into the film base and setting into deformed pattern by polymerization of acrylic acid in the emulsion layer).

*Example 5*

Three grams of silver bromide precipitate were mixed with 50 ccs. of a 0.01% water solution of Dye 10 above, and the mixture allowed to stand for 10 minutes. The silver bromide precipitate was washed with water and 1 gram of precipitate was placed in 5 ccs. of a solution that contained 30% by weight of acrylamide and 2% by weight of sodium sulfite. The acrylamide-sodium sulfite had been allowed to stand for 3 days prior to use. The mixture was then coated on a glass support, covering an area of 12.5 cm.$^2$. The coating was then exposed to a line image by means of $6 \times 10^{17}$ quanta/cm.$^2$ of 546 m$\mu$ radiation. The exposed coating was washed with water, which easily removed the unexposed areas, leaving the exposed areas in relief.

*Example 6*

In exactly the manner described in Example 3 above, coatings containing acrylamide were prepared and exposed, using ordinary silver bromide, silver chloride, or silver chlorobromide emulsions in place of the silver bromoiodide emulsion of that example. The coatings all contained approximately 0.02 gram of acrylamide solution/cm.$^2$, although it was found that considerably larger amounts can be present. The temperature of the coatings was approximately 25° C.

*Example 7*

Three grams of silver chloride precipitate were mixed with a 0.01% by weight solution of Dye 1 in water, and the mixture allowed to stand for 10 minutes. The precipitate was then washed with water. One gram of the precipitate was placed in a 5 cc. solution containing 30% by weight of acrylamide and 2% by weight of sodium sulfite. The acrylamide solution had been allowed to stand for 3 days prior to use. The mixture was then coated on an ordinary glass support and exposed through the glass support to a line image using $3.8 \times 10^{16}$ quanta/cm.$^2$ of 436 m$\mu$ radiation. The coating was then washed with water, which removed the unexposed areas, leaving the exposed areas firmly attached to the plate.

*Example 8*

A sensitized silver chloride precipitate was prepared as described in Example 7, using Dye 2 instead of Dye 1 as the sensitizer. The washed silver halide precipitate was then mixed with 5 grams of acrylamide-sulfite solution exactly as described in Example 7, 1 gram of the precipitate being used. The mixture was then coated on an ordinary glass plate, covering an area of 12.5 cm.$^2$. The coating was then exposed to a line image through the glass plate using $1.4 \times 10^{17}$ quanta/cm.$^2$ of 578 m$\mu$ radiation. The coating was then washed with water, which removed the unexposed, monomeric areas, leaving the exposed areas which consisted of polyacrylamide, silver and silver chloride.

*Example 9*

A silver chloride precipitate was sensitized with an aqueous solution containing 0.0075% by weight of Dye 4 (chloride) and 0.0025% by weight of Dye 5. The sensitized precipitate was then washed with water three times, and 1 gram of precipitate was mixed with 1.5 grams of the acrylamide solution described in Example 7. The mixture was coated on an ordinary glass support, covering an area of 12.5 cm.$^2$. The coating was exposed through the glass support to a line image using $3 \times 10^{16}$ quanta/cm.$^2$ of 578 m$\mu$ radiation. The unexposed areas were removed by washing with water, and an insoluble silver-silver-chloride-polymer image was left behind.

The combination of dyes described in Example 9 above was more effective than either dye alone.

*Example 10*

A silver chloride precipitate was sensitized as described in Example 7, using Dye 3 in place of Dye 1. One gram of the sensitized precipitate was mixed with 5 grams of the acrylamide-sulfite solution described in Example 7. The mixture was coated on a glass support and exposed to a line image through the support, using $6 \times 10^{17}$ quanta/cm.$^2$ of 546 m$\mu$ radiation. The unexposed areas of the coating were removed with water, leaving an insoluble image behind.

*Example 11*

A silver bromide precipitate was sensitized with an aqueous solution containing 0.0075% by weight of Dye 6 and 0.0025% by weight of Dye 5, in the manner described in Example 1. After washing three times in distilled water, 1 gram of the precipitate was mixed with 5 grams of the acrylamide solution used in Example 7 and coated on a glass plate, covering an area of 12.5 cm.$^2$. The coating was then exposed through the support, using $6 \times 10^{17}$ quanta/cm.$^2$ of 546 m$\mu$ radiation. The unexposed areas of the coating were removed by washing with water, leaving an insoluble polymer image behind.

The combination of dyes used in Example 11 was much more effective than either dye alone.

*Example 12*

An ordinary gelatino-silver-chloride emulsion coated on a cellulose acetate support, and containing 432 mg. of silver ion per square foot and 0.8 mg. of Dye 2 per square foot, was coated with a mixture containing 300 grams/liter of acrylamide, 20 grams/liter of sodium sulfite and enough sodium sulfate to saturate the water solution, the coverage of the acrylamide solution being 0.02 gram/cm.$^2$. The coating was exposed through the film base to $5 \times 10^{17}$ quanta/cm.$^2$ of 578 m$\mu$ radiation, the exposure being made to an ordinary line image. After exposure, the unexposed areas of the emulsion were washed away with water, leaving the exposed areas which were not soluble.

*Example 13*

Another sample of the emulsion described in Example 12 above, but containing 0.8 mg./ft.$^2$ of Dye 4 instead of Dye 2, was coated at a coverage of 0.2 gram/cm.$^2$ of the mixture described in Example 12. The coating was then exposed to a line image through the film base using $5 \times 10^{17}$ quanta/cm.$^2$ of 578 m$\mu$ radiation. The exposed coating was then washed with water, which removed the unexposed areas but left the exposed areas firmly attached to the film base, which consisted of cellulose acetate.

In exactly the manner described in Example 13 above, another sample of the same silver chloride emulsion containing 0.8 mg./ft.$^2$ of Dye 4 and 0.24 mg./ft.$^2$ of Dye 5 was coated with the same acrylamide solution described in Example 12 and at the same coverage. Exposure of the treated emulsion exactly as described in Example 13 gave an insoluble polymer in the areas exposed. The unexposed areas were easily removed by washing with water.

*Example 14*

A silver chloride precipitate was sensitized with Dye 7, as described in Example 7. The precipitate was washed with water and 1 gram of the precipitate was mixed with 5 grams of the acrylamide solution used in Example 7. The mixture was coated on a glass support, covering an area of 12.5 cm.$^2$. The coating was exposed through the glass support to a line image, using $2.7 \times 10^{18}$ quanta/cm.$^2$ of 436 m$\mu$ radiation. The unexposed areas were easily removed by washing with water and an insoluble image remained in the exposed areas.

*Example 15*

A silver chloride precipitate was sensitized exactly as in Example 7, using Dye 9 instead of Dye 1. The precipitate was washed with water and 1 gram of the washed precipitate was mixed with 5 grams of the acrylamide solution used in Example 7. The mixture was coated on a glass support (coverage 12.5 cm.$^2$) and exposed through the support to $1.7 \times 10^{17}$ quanta/cm.$^2$ of 436 m$\mu$ radiation. The unexposed areas of the mixture were easily removed with water, while the exposed areas remained behind.

*Example 16*

A silver chloride precipitate was sensitized exactly as described in Example 7, using Dye 8 instead of Dye 1. The precipitate was washed with water and 1 gram was mixed with 5 grams of the acrylamide solution used in Example 7. The mixture was then coated on a glass plate, covering an area of 12.5 cm.² The coating was then exposed to a line image using $1.5 \times 10^{18}$ quanta/cm.² of 578 mμ radiation. The unexposed areas were easily removed by washing with water, leaving behind the exposed areas which formed the desired photographic image.

*Example 17*

A silver bromiodide emulsion containing 1 mole percent of silver iodide was coated on ordinary cellulose acetate film support at a coverage of 540 mg. of silver ion/ft.² The coating contained 0.75 mg. of Dye 4 and 0.26 mg. of Dye 5. The emulsion was then coated with the acrylamide solution described in Example 1 giving a coverage of 0.02 gram of acrylamide solution/cm.² The resulting photographic element was then exposed to a line image using $5 \times 10^{17}$ quanta/cm.² of 578 mμ radiation, the exposure being made through the support. The element was then washed with water, which removed the unexposed areas, leaving an image in the exposed areas.

In all of the above examples, exposures were made through the transparent supports, although it is possible to expose the coatings from the reverse side of the support. When proceeding in this manner, it is generally desirable to transfer the coating to another support before washing with water. The transferred layer can then be washed with water, leaving the exposed areas firmly fixed to the substitute support.

It has also been found that silver halides can be used to sensitize the polymerization of liquid polymerizable monomers, many of which are water-insoluble, or have limited solubility in water. For such purposes, the silver halide can be suspended in the liquid monomer, or a solution of the monomer in a non-aqueous solvent (e.g., dimethylformamide, β-ethoxyethanol, etc.), and the liquid composition subjected to irradiation in the manner described above. A mixture results, and the polymer can be separated therefrom by pouring the mixture into water or some diluent in which the polymer is not soluble, but in which the monomer will dissolve. Monomers which are useful in the foregoing process include styrene, methylmethacrylate, N-vinyl-2-pyrrolidone, etc. The technique can also be used to treat the monomers described in Examples 1 to 17 above, although the results are not as outstanding as those of the examples. Other monomers, such as acrylonitrile, can also be polymerized by simply suspending the silver halide in the monomer without using any water in the system. It has been found that improved yields can be obtained in these non-aqueous systems using adducts of sulfur-dioxide and organic amines, such as β-aminoethanol, β-methylaminoethanol, etc. The amount of adduct used can vary, although from about 1 to 10% by weight of the adduct, based on the weight of the monomer has been found to give excellent results. In the above-described non-aqueous system, it has been found that the polymer obtained from N-vinyl-2-pyrrolidone dissolves in the same solvents as the monomer and that a special separation technique is required. An irradiated mixture can be separated into its component parts by mixing with a silver halide solvent, such as an aqueous sodium thiosulfate solution. This treatment dissolves the silver halide, as well as the monomer and the polymer. The polymer can then be salted out from the mixture by treatment with sodium sulfate.

The term "fluid" as used in the following claims in reference to the compositions means compositions varying from a water-like consistency to compositions having a paste-like consistency. In other words, such compositions do not have the characteristics of solids, but flow freely, either as a result of their own mass or by the application of pressure.

The accompanying drawing illustrates photographic elements which are useful in practicing our invention. Each figure of the drawing shows, in cross-sectional view, photographic supports coated with compositions adapted to the formation of photographic reliefs.

In FIGURE 1, a support 10 has coated thereon a layer 11 containing acrylamide (in aqueous solution) and silver halide particles.

In FIGURE 2 support 10 has coated thereon an ordinary photographic silver halide emulsion 12 and a layer 13 containing monomeric acrylamide. The photographic elements illustrated in FIGURES 1 and 2 can be employed in the manner shown in the above examples.

The speed of the photopolymerizations can be somewhat accelerated by evacuating the air above the polymerization surface, or mixture, or by replacing the air with an inert atmosphere, e.g., nitrogen, argon, etc.

What we claim as our invention and desire secured by Letters Patent of the United States is:

1. A composition useful in the preparation of photographic relief images consisting of (1) at least 10 grams/liter of an olefinically-unsaturated monomer selected from the class comprising water-soluble acrylic monomers and water-soluble methacrylic monomers, (2) at least 100 grams/liter of silver halide in finely divided form, said silver halide being sensitive to radiation in the blue and ultraviolet regions of the spectrum, (3) from 0.1 to 100 grams/liter of an alkali metal sulfite, and (4) sufficient water to render said composition fluid.

2. A composition useful in the preparation of photographic relief images consisting of (1) at least 10 grams/liter of acrylamide, (2) at least 100 grams/liter of a silver halide in finely divided form, said silver halide being sensitive to radiation in the blue and ultraviolet regions of the spectrum, (3) from 0.1 to 100 grams/liter of an alkali metal sulfite, and (4) sufficient water to render said composition fluid.

3. A composition useful in the preparation of photographic relief images consisting of (1) at least 10 grams/liter of acrylamide, (2) at least 100 grams/liter of a silver halide in finely divided form, said silver halide being sensitive to radiation in the blue and ultraviolet regions of the spectrum, said silver halide being sensitized with a dye selected from those represented by the following general formula:

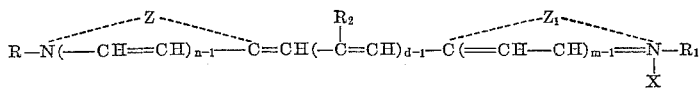

wherein R and $R_1$ each represents an alkyl group, $R_2$ represents a member selected from the group consisting of a hydrogen atom, an alkyl group and an aryl group, X represents an acid radical, d, m, and n each represents a positive integer of from 1 to 2 and Z and $Z_1$ each represents the nonmetallic atoms necessary to complete a heterocyclic nucleus selected from the class consisting of those of the benzoxazole series, those of the benzothiazole series and those of the quinoline series, (3) from 0.1 to 100 grams/liter of an alkali metal sulfite, and (4) sufficient water to render said composition fluid.

4. A composition useful in the preparation of photographic relief images consisting of (1) at least 10 grams/liter of acrylamide, (2) at least 100 grams/liter of a silver halide in finely divided form, said silver halide being sensitive to radiation in blue and ultraviolet regions of the spectrum, said silver halide being sensitized with a dye selected from those represented by the following general formula:

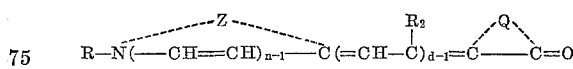

wherein R represents an alkyl group, $R_2$ represents a member selected from the group consisting of a hydrogen atom, an alkyl group and an aryl group, $d$ and $n$ each represents a positive integer of from 1 to 2, Z represents the nonmetallic atoms necessary to complete a heterocyclic nucleus selected from the class consisting of those of the benzoxazole series, those of the benzothiazole series, and those of the quinoline series, and Q represents the nonmetallic atoms necessary to complete a heterocyclic nucleus selected from the class consisting of those of the pyrazolinone series and those of the rhodanine series, (3) from 0.1 to 100 grams/liter of an alkali metal sulfite, and (4) sufficient water to render said composition fluid.

5. A composition useful in the preparation of photographic relief images consisting of (1) at least 10 grams/liter of acrylamide, (2) at least 100 grams/liter of a silver halide in finely divided form, said silver halide being sensitive to radiation in the blue and ultraviolet regions of the spectrum, said silver halide being sensitized with a dye selected from those represented by the following general formula:

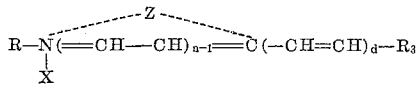

wherein R represents an alkyl group, $R_3$ represents a member selected from a group consisting of an arylamino group and an aminoaryl group, X represents an acid radical, $d$ and $n$ each represents a positive integer of from 1 to 2 and Z represents the nonmetallic atoms necessary to complete a heterocyclic nucleus selected from the class consisting of those of the benzoxazole series, those of the benzothiazole series, and those of the quinoline series, (3) from 0.1 to 100 grams/liter of an alkali metal sulfite, and (4) sufficient water to render said composition fluid.

6. A photographic element comprising a transparent support having coated thereon a layer consisting of (1) acrylamide, (2) sufficient water to give the layer a pastelike consistency, (3) an alkali metal sulfite and (4) a silver halide in finely-divided form, said silver halide being sensitive to radiation in the blue and ultraviolet regions of the spectrum, the concentration of said acrylamide being at least $10^{-1}$ mg./cm.$^2$, the concentration of said silver halide being at least 1 mg./cm.$^2$ and the concentration of said alkali metal sulfite being at least $10^{-3}$ mg./cm.$^2$.

7. A photographic element as defined in claim 6, wherein said silver halide is silver chloride.

8. A photographic element as defined in claim 6, wherein said silver halide is silver bromide.

9. A photographic element as defined in claim 6, wherein said silver halide is chlorobromide.

10. A photographic element as defined in claim 6, wherein said silver halide is silver bromiodide.

11. The process of forming a polymerized image which comprises (A) contacting a gelatino-silver halide emulsion layer with a composition comprising (1) at least 10 grams/liter of an olefinically-unsaturated monomer selected from the class comprising water-soluble acrylic monomers and water-soluble methacrylic monomers, (2) from 0.1 to 100 grams/liter of an alkali metal sulfite, and (3) sufficient water to render said composition fluid, (B) exposing said emulsion layer to a line image, and (C) washing said emulsion layer to remove unexposed areas.

12. A photographic element comprising a support having coated thereon a layer consisting of (1) an olefinically-unsaturated monomer selected from the class comprising water-soluble acrylic monomers and water-soluble methacrylic monomers, (2) sufficient water to give the layer a pastelike consistency, (3) an alkali metal sulfite, and (4) a member selected from the class consisting of silver halide precipitate in finely divided form and a photographic silver halide emulsion, the concentration of said monomer being at least $10^{-1}$ mg./cm.$^2$, the concentration of said silver halide being at least 1 mg./cm.$^2$, and the concentration of said alkali metal sulfite being at least $10^{-2}$ grams/cm.$^2$.

References Cited in the file of this patent

UNITED STATES PATENTS

| | | |
|---|---|---|
| 1,587,274 | Beebe et al. | June 1, 1926 |
| 2,196,714 | Wellman | Apr. 9, 1940 |
| 2,380,280 | Weyerts | July 10, 1945 |
| 2,510,426 | Smith | June 6, 1950 |
| 2,661,331 | Howard | Dec. 1, 1953 |
| 2,666,701 | West | Jan. 19, 1954 |

FOREIGN PATENTS

| | | |
|---|---|---|
| 566,795 | Great Britain | Jan. 15, 1945 |

OTHER REFERENCES

Oster: Nature, 173, 300–301 (1954).
Chemical Abstracts, 49, 14491c (1955).